United States Patent
Hwang et al.

(10) Patent No.: US 11,854,236 B2
(45) Date of Patent: Dec. 26, 2023

(54) FASTENING TOOL SYSTEM AND CONTROL METHOD THEREOF

(71) Applicants: HYUNDAI MOTOR COMPANY, Seoul (KR); KIA MOTORS CORPORATION, Seoul (KR); INHA UNIVERSITY RESEARCH AND BUSINESS FOUNDATION, Incheon (KR)

(72) Inventors: Tae Mun Hwang, Jeonju-si (KR); DongHa Jeong, Uiwang-si (KR); Byung Cheol Song, Seoul (KR); Dong Yoon Choi, Seosan-si (KR)

(73) Assignees: HYUNDAI MOTOR COMPANY, Seoul (KR); KIA MOTORS CORPORATION, Seoul (KR); INHA UNIVERSITY RESEARCH AND BUSINESS FOUNDATION, Incheon (KR)

( * ) Notice: Subject to any disclaimer, the term of this patent is extended or adjusted under 35 U.S.C. 154(b) by 514 days.

(21) Appl. No.: 17/004,659

(22) Filed: Aug. 27, 2020

(65) Prior Publication Data
US 2021/0101263 A1    Apr. 8, 2021

(30) Foreign Application Priority Data
Oct. 7, 2019   (KR) .......................... 10-2019-0123901

(51) Int. Cl.
*G06V 10/10*   (2022.01)
*B25B 21/00*   (2006.01)
(Continued)

(52) U.S. Cl.
CPC ............ *G06V 10/17* (2022.01); *B25B 21/002* (2013.01); *B25B 23/147* (2013.01); *G01C 3/02* (2013.01);
(Continued)

(58) Field of Classification Search
CPC ...... G06V 10/17; G06V 10/242; G06V 10/32; G06V 10/764; G06V 10/82; G06V 20/10;
(Continued)

(56) References Cited

U.S. PATENT DOCUMENTS 10,514,667 B2   12/2019 Okuda
2017/0197302 A1*  7/2017 Kobayashi ............ B25B 13/463
(Continued)

FOREIGN PATENT DOCUMENTS

JP      2018092428 A    6/2018
JP      2018149677 A    9/2018
(Continued)

*Primary Examiner* — Tom Y Lu
(74) *Attorney, Agent, or Firm* — LEMPIA SUMMERFIELD KATZ LLC

(57) ABSTRACT

A fastening tool system for fastening a component part by using a supplied power includes: a camera portion mounted on a fastening tool to photograph a fastening portion of the component part; an image input portion for inputting an image photographed from the camera portion when a distance with the fastening portion measured through a distance measurement sensor is within a predetermined distance; a communication portion for transmitting data by wireless communication; and a fastening portion determining portion that recognizes the fastening portion through machine learning algorithm-based image classification work for an input image of the camera portion and sets a torque value matched with the recognized fastening portion.

14 Claims, 8 Drawing Sheets

(51) Int. Cl.
| | |
|---|---|
| G01C 3/02 | (2006.01) |
| G01J 5/00 | (2022.01) |
| G06T 5/40 | (2006.01) |
| G06T 3/60 | (2006.01) |
| G06T 7/00 | (2017.01) |
| B25B 23/147 | (2006.01) |
| G06V 20/10 | (2022.01) |
| G06V 20/40 | (2022.01) |
| G06F 18/21 | (2023.01) |
| G06F 18/22 | (2023.01) |
| G06F 18/24 | (2023.01) |
| H04N 23/54 | (2023.01) |
| H04N 23/56 | (2023.01) |
| G06V 10/764 | (2022.01) |
| G06V 10/82 | (2022.01) |
| G06V 10/32 | (2022.01) |
| G06V 10/24 | (2022.01) |
| G06V 20/20 | (2022.01) |
| G06K 7/14 | (2006.01) |
| G06V 10/50 | (2022.01) |

(52) U.S. Cl.
CPC ............... *G01J 5/00* (2013.01); *G06F 18/21* (2023.01); *G06F 18/22* (2023.01); *G06F 18/24* (2023.01); *G06T 3/60* (2013.01); *G06T 5/40* (2013.01); *G06T 7/0004* (2013.01); *G06V 10/242* (2022.01); *G06V 10/32* (2022.01); *G06V 10/764* (2022.01); *G06V 10/82* (2022.01); *G06V 20/10* (2022.01); *G06V 20/20* (2022.01); *G06V 20/41* (2022.01); *H04N 23/54* (2023.01); *H04N 23/56* (2023.01); *G01J 2005/0077* (2013.01); *G06K 7/1413* (2013.01); *G06K 7/1417* (2013.01); *G06T 2207/10016* (2013.01); *G06T 2207/10048* (2013.01); *G06T 2207/20084* (2013.01); *G06T 2207/30164* (2013.01); *G06V 10/50* (2022.01)

(58) Field of Classification Search
CPC ........ G06V 20/20; G06V 20/41; G06V 10/50; B25B 21/002; B25B 23/147; G01C 3/02; G01J 5/00; G01J 2005/0077; G06F 18/21; G06F 18/22; G06F 18/24; G06T 3/60; G06T 5/40; G06T 7/0004; G06T 2207/1001; G06T 2207/10048; G06T 2207/20084; G06T 2207/30164; G06T 7/80; G06T 2207/30248; H04N 23/54; H04N 23/56; G06K 7/1413; G06K 7/1417; B62D 65/028; B62D 65/026; G06N 20/00
See application file for complete search history.

(56) References Cited

U.S. PATENT DOCUMENTS

| | | | |
|---|---|---|---|
| 2018/0157226 A1 | 6/2018 | Okuda | |
| 2021/0056682 A1* | 2/2021 | Ward | G06N 20/00 |
| 2021/0360775 A1* | 11/2021 | Smith | H05K 1/0243 |

FOREIGN PATENT DOCUMENTS

| | | |
|---|---|---|
| JP | 2019144965 A | 8/2019 |
| KR | 20080111325 A | 12/2008 |
| KR | 20140078427 A | 6/2014 |
| KR | 20140146906 A | 12/2014 |
| KR | 101492473 B1 | 2/2015 |
| KR | 20180007783 A | 1/2018 |

* cited by examiner

FASTENING TOOL SYSTEM AND CONTROL METHOD THEREOF

CROSS-REFERENCE TO RELATED APPLICATION

This application claims priority to and the benefit of Korean Patent Application No. 10-2019-0123901 filed in the Korean Intellectual Property Office on Oct. 7, 2019, the entire contents of which are incorporated herein by reference.

BACKGROUND

(a) Field of the Invention

The present disclosure relates to a fastening tool system and a control method thereof.

(b) Description of the Related Art

In general, in a vehicle factory, various fastening tools suitable for fastening portions and fastening conditions are used to assemble various component parts applied to a vehicle body for each production line.

For such a purpose, a worker should know appropriate fastening tool and torque value depending on the fastening portion of the component part. During the fastening work, the worker frequently replaces with a fastening tool having the appropriate torque value or changes the torque value through an operation button if such is provided on the fastening tool.

However, if the worker should replace the fastening tools, the working efficiency may be deteriorated. In other words, managing various fastening tools may become difficult and excessive maintenance costs may be caused. In addition, in the case that the fastening work is done by changing the torque value with one fastening tool, the worker should correctly remember the appropriate torque value of each fastening portion of each component part. Otherwise, a human error may occur, thereby adversely affecting product quality.

Therefore, there is a need to improve the working efficiency of the fastening work and to reduce the maintenance cost while ensuring the fastened state of the parts.

The above information disclosed in this Background section is only for enhancement of understanding of the background of the disclosure, and therefore it may contain information that does not form the prior art that is already known in this country to a person of ordinary skill in the art.

SUMMARY

A fastening tool system for fastening a component part by using a supplied power may include a camera portion mounted on a fastening tool to photograph a fastening portion of the component part. The system may further include an image input portion for inputting an image photographed from the camera portion when a distance with the fastening portion measured through a distance measurement sensor is within a predetermined distance. The system may further include a communication portion for transmitting data by wireless communication. The system may further include a fastening portion determining portion that recognizes the fastening portion through machine learning algorithm-based image classification work for an input image of the camera portion and sets a torque value matched with the recognized fastening portion.

The camera portion may be formed as a near infrared (NIR) camera having an infrared light source.

The distance measurement sensor may be positioned to irradiate a laser point to a center of an image photographed by the camera portion.

The fastening portion determining portion may perform the image classification work by utilizing fastening learned data, in which a representative model image for each fastening portion of the component part learned by convolutional neural network (CNN) algorithm-based learning is set according to vehicle specification information.

As pre-processing work for utilizing the input image for the image classification work, the fastening portion determining portion may perform: image rotation matching work that matches the input image having various angles with the representative model image; brightness adjust work that adjusts brightness of the input image through histogram equalization work; and tool image masking work that masks a tool socket image existing in the input image.

The image rotation matching work may include: masking an outer portion of a circle based on a center of the input image; calculating a slope angle according to a statistical value of slope distribution for each region of the input image obtained through histogram of gradient (HOG) algorithm; and performing matching by rotating the input image based on the slope angle.

The fastening portion determining portion may perform the matching by rotating the input image in a direction close to a representative model image based on the slope angle.

The fastening portion determining portion may estimate a fastening portion through an inference process through a CNN algorithm-based image classification work on a video input image of a same fastening portion finished with the pre-processing work.

The fastening portion determining portion may select a fastening portion of a class having a highest probability value among class information of the fastening portion and probability values consecutively output for the video input image during the inference process, and may automatically set the torque value according to the recognized fastening portion when a probability value of a selected fastening portion is above reference ratio.

The fastening portion determining portion may output fastening portion information and the torque value through a display mounted on the fastening tool.

The fastening portion determining portion may include a tag recognition program that recognizes the vehicle specification information from a barcode or QR code image of a vehicle acquired through the camera portion.

The fastening tool system may further include a fastening portion learning portion configured to construct learning data on various component parts in advance, and to generate fastening learned data by learning through CNN algorithm. The system may further include a tool controller configured to code the fastening portion of the component part in conjunction with a fastening portion learning server, and to transmit the fastening learned data for each fastening portion, in which a suitable torque value is matched for each code of the fastening portion, to the fastening tool.

The fastening portion learning server may include a fastening portion learning portion configured to generate a rotation matching algorithm, in which two representative model images with respect to two rotating directions among images photographed at various rotation angles are designated at a 180 degree interval with respect to a same fastening portion. The fastening portion learning server may further include a database storing fastening portion code information of the fastening learned data and torque values matched with the fastening portion code.

The fastening portion learning portion may generate a model image learned based on angles of the two representative model images, may apply the model image to CNN algorithm-based fastening learned data, and may update the model image by additional learning.

The tool controller may be configured: to receive fastening work history data from the fastening tool; to collect additional learning data when an image classification work of the fastening portion fails or when a probability value in an inference process of the fastening portion is below an upper limit reference ratio; and to transmit the collected additional learning data to the fastening portion learning server.

A control method of a fastening tool for fastening a component part includes photographing a fastening portion of the component part through a camera portion mounted on the fastening tool. The method further includes pre-processing that rotates an input image photographed by the camera portion to match with representative model image. The method further includes estimating the fastening portion through an inference process through a convolutional neural network (CNN) algorithm-based image classification work on a video input image of a same fastening portion finished with the pre-processing work. The method further includes setting a torque value matched with a recognized fastening portion when a probability value of the fastening portion in the inference process exceeds a predetermined reference ratio.

The pre-processing may include: masking an outer portion of a circle based on a center of the input image; calculating a slope angle according to a statistical value of slope distribution for each region of the input image obtained through histogram of gradient (HOG) algorithm; and performing matching by rotating the input image based on the slope angle.

The pre-processing may further include adjusting brightness of the input image through histogram equalization work and masking a tool socket image existing in the input image.

The estimating the fastening portion may include accumulating and averaging probability information output from a previous frame of the video input image and may include selecting a fastening portion of a class having a highest probability value among class information of the fastening portion and probability values consecutively output for the video input image during the inference process.

In the setting of the torque value, when the highest probability value is below the reference ratio, the torque value may be manually set, and images photographed for a predetermined period of time immediately prior to currently performed fastening work may be stored as additional learning data.

According to an embodiment, even if the worker does not know the torque value suitable for the fastening portion, the efficiency of work may be improved and the maintenance cost may be reduced by using same fastening tool with different torques, by automatically performing fastening portion recognition and torque value change through image-based machine learning algorithm provided to the fastening tool.

In addition, by performing learning and updating of fastening learned data by collecting the fastening portion images with low recognition probability as additional learning data during worker fastening work, a learned model image may be generated adaptively to the propensity of workers and classification performance and fastening assurance performance for the fastening portion may be continuously enhanced.

DETAILED DESCRIPTION OF THE EMBODIMENTS

Figure 1:
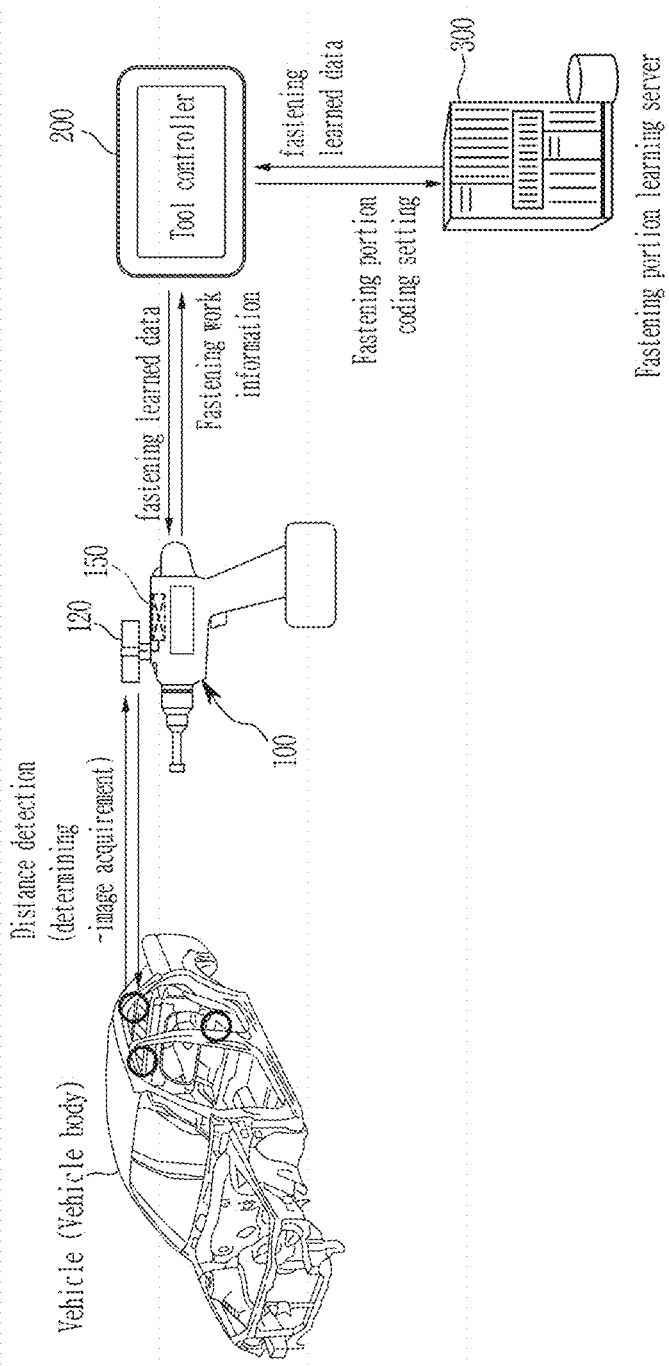
FIG. 1 schematically illustrates a fastening tool system according to an embodiment.

In the following detailed description, only predetermined specific embodiments of the present disclosure have been shown and described, simply by way of illustration. As those having ordinary skill in the art should realize, the described embodiments may be modified in various different ways, all without departing from the spirit or scope of the present disclosure. Accordingly, the drawings and description should be regarded as illustrative in nature and not restrictive. Identical reference numerals designate identical or equivalent elements throughout the specification.

In addition, unless explicitly described to the contrary, the word "comprise," and variations such as "comprises" or "comprising," should be understood to imply the inclusion of stated elements but not the exclusion of any other elements. In addition, the terms "-er," "-or," and "module" described in the specification mean units for processing at least one function and operation and can be implemented by hardware components or software components, and combinations thereof. When a component, device, element, or the like of the present disclosure is described as having a purpose or performing an operation, function, or the like, the component, device, or element should be considered herein as being "configured to" meet that purpose or to perform that operation or function. Further, the controller described herein may include a processor programmed to perform the noted operation, function, operation, or the like.

In this specification, it should be understood that when one component is referred to as being "connected" or "coupled" to another component, it may be connected or coupled directly to the other component or be connected or coupled to the other component with a further component intervening therebetween. In this specification, it should be understood that when one component is referred to as being "connected or coupled directly" to another component, it may be connected to or coupled to the other component without another component intervening therebetween.

Hereinafter, a fastening tool system and a control method thereof according to an embodiment are described in detail with reference to the drawings.

In general, in the case of a machine learning-based image recognition algorithm, it shows excellent image recognition performance in a situation where data for learning is sufficiently obtained. Accordingly, a recent image recognition algorithm has been developed that may operate robustly against variation in illumination environments, shapes, and photographing angles of images. However, in the case of such an image recognition algorithm, it must have a large calculation load to have robustly improved performance for various circumstances, so there is a drawback that hardware and learning data are vastly increased. A lightweight algorithm may be developed to overcome such a drawback, but there may be a trade-off between stability and performance. Therefore, a pre-processing technique causing a low calculation load is beneficial for a lightweight algorithm to cope with various circumstances.

In addition, in the case of the existing machine learning-based image recognition algorithm, the model is trained using the learning data prepared in advance and the model with fixed performance is continuously used in the inference process. However, the quality of the data set cannot be guaranteed when a user directly configures and uses the data set. In addition, if the learning data for a particular situation is not sufficient, the performance may be deteriorated in that situation, and a situation that continuously shows low performance may occur. Therefore, there is a need for a method for supplementing the learning data to solve this and a method for updating the model of the machine learning algorithm.

Accordingly, a fastening tool system according to an embodiment may identify a fastening portion image of a component part photographed through a camera mounted on a fastening tool by using a learning model of a lightweight machine learning algorithm, and automatically varies a torque value of the fastening tool to a value matched thereto.

FIG. 1 schematically illustrates a fastening tool system according to an embodiment.

Figure 2:
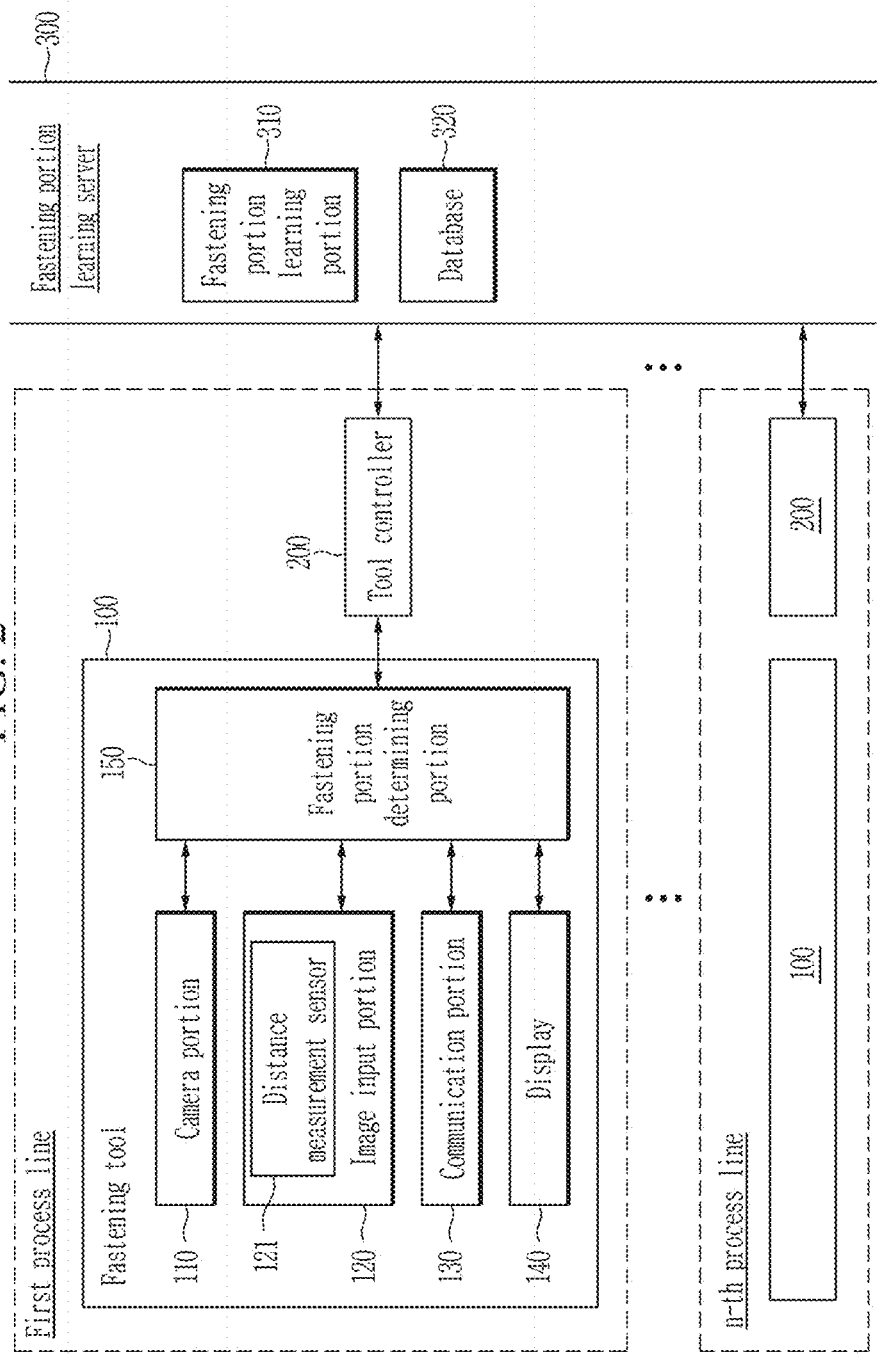
FIG. 2 is a block diagram illustrating a fastening tool system according to an embodiment.

FIG. 2 is a block diagram illustrating a fastening tool system according to an embodiment.

Referring to FIG. 1 and FIG. 2, a fastening tool system according to an embodiment includes a fastening tool 100, a tool controller 200, and a fastening portion learning server 300.

The fastening tool 100 analyzes an image obtained from a mounted camera portion through a machine learning algorithm to recognize the fastening portion of the component part, and automatically varies a torque value of the fastening tool 100 to a value matched to the fastening portion.

The tool controller 200 is connected to the fastening tool 100 by wireless communication to perform fastening portion recognition and to collect torque setting information.

The fastening portion learning server 300 is configured to learn learning data of images for respective fastening portions of a component part in advance and to generate fastening learned data for the fastening portion recognition and the torque value setting, such that the fastening tool 100 may utilize the generated fastening learned data.

Hereinafter, components of the fastening tool system are described in further detail.

The fastening tool 100 includes a camera portion 110, an image input portion 120, a communication portion 130, a display 140, and a fastening portion determining portion 150.

The fastening tool 100 is a powered tool capable of being coupled with a socket, in order to fasten the fastening portion of the component part, for example, by including a motor, a battery, and/or a control panel.

The camera portion 110 is mounted on the fastening tool 100 to photograph the fastening portion of the component part.

The camera portion 110 may be applied with a near infrared (NIR) camera to acquire an image without being affected by various illumination environments of working environments and may include an infrared light source. However, the camera portion 110 is not limited to the NIR camera, and various infrared cameras known may also be applied.

The image input portion 120 measures a distance to the fastening portion by a distance measurement sensor 121, and transmits the image photographed by the camera portion 110 to the fastening portion determining portion 150 when the distance is within a predetermined distance, i.e., when the fastening tool 100 is sufficiently close to the fastening portion. The distance measurement sensor 121 may be positioned to irradiate a laser point to a center of an image photographed by the camera portion 110, such that handling of the fastening tool 100 by a worker may be guided in order to acquire a precise and accurate image of the fastening portion.

The communication portion 130 is connected to the tool controller 200 to transmit data by wireless communication scheme. The communication portion 130 may be connected to the tool controller 200 through short-range wireless communication scheme such as Bluetooth or wireless LAN.

The display 140 may display information generated according to an operation of the fastening tool 100.

The display 140 may be configured as a touchscreen capable of input and output by worker manipulation.

The fastening portion determining portion 150 controls an overall operation for the fastening tool 100 according to an embodiment to variably set a torque value according to image-based fastening portion recognition. The fastening portion determining portion 150 may include at least one processor and a memory storing a corresponding program and data.

The fastening portion determining portion 150 recognizes the fastening portion of the component part through a machine learning-based, e.g., convolutional neural network (CNN) algorithm-based, image classification work with respect to an image input from the camera portion 110, and changes the torque setting of the fastening tool 100 to a torque value matched to the code of the recognized fastening portion.

At this time, the fastening portion determining portion 150 stores fastening learned data, in which a representative model image for each fastening portion of the component part learned at the fastening portion learning server 300 by CNN algorithm-based learning is set according to the vehicle specification information, and utilizes the fastening learned data to perform the image classification work.

The fastening portion determining portion 150 may output fastening portion information and torque values through a display 140 mounted on the fastening tool 100 such that workers may check, and the fastening tool 100 may perform fastening work with the changed torque value.

In addition, the fastening portion determining portion 150 further includes a tag recognition program, to recognize the vehicle specification information from a barcode or QR code image acquired through the camera portion 110. Through this, adaptive image classification work may be performed by selectively utilizing fastening learned data suitable for the vehicle type, component part specification, and work scope for the component part input to the process line.

The tool controller 200 may be configured as an information communication terminal, for example, a tablet PC, a smart phone, and/or a laptop, installed with a program for managing variable torque setting function for each fastening portion of the fastening tool 100.

The tool controller 200 codes the fastening portion of the component part in conjunction with the fastening portion learning server 300, and provides fastening learned data for each fastening portion matching the torque value suitable for the code of the fastening portion to the fastening tool 100.

The tool controller 200 codes the fastening portion of the component part in conjunction with the fastening portion learning server 300, and provides the fastening learned data for each fastening portion, in which a suitable torque value is matched for each code of the fastening portion, to the fastening tool 100. In other words, the tool controller 200 may transmit the fastening learned data for each fastening portion to the fastening tool 100, such that the fastening tool 100 may store the data to be used for determining of the fastening portion and for variably setting the torque value by the fastening portion determining portion 150.

Here, the fastening learned data may include representative model images for the fastening portion recognition according to vehicle specification information learned at the fastening portion learning server 300 by CNN algorithm-based learning, and torque values matched with the representative model images. The tool controller 200 classifies process lines, vehicle specification information, work scopes, and fastening portions to be applied by the fastening tool 100. The tool controller 200 also collects only the fastening learned data matched with such from the fastening portion learning server 300. Therefore, the image classification work of the fastening tool 100 may be simplified, and thus unnecessary calculation load and image classification work may be decreased.

In addition, periodically or non-periodically, when the fastening learned data is updated from the fastening portion learning server 300, the tool controller 200 may transmit the updated fastening learned data to the fastening tool 100 to update the fastening portion determining portion 150.

In addition, the tool controller 200 may accumulate recognition information and images of the fastening portion at various angles collected by the fastening tool 100 during the fastening work of the component part. The tool controller 200 may also may transmit the accumulated recognition information and images to the fastening portion learning server 300.

The fastening portion learning server 300 may be a computing system to support operation of the fastening tool 100 and the tool controller 200 disposed for each process line in the factory, and may be configured as a combination of hardware, e.g., including at least one processor, a memory, and a communication interface, and software running on the hardware.

The fastening portion learning server 300 includes a fastening portion learning portion 310 and a database 320.

In order to provide the fastening tool 100 with an image-based recognition function of the fastening portion of the component part, the fastening portion learning portion 310 may construct learning data on various component parts in advance, and may generate the fastening learned data by learning through CNN algorithm, which is machine learning-based algorithm.

Figure 3:
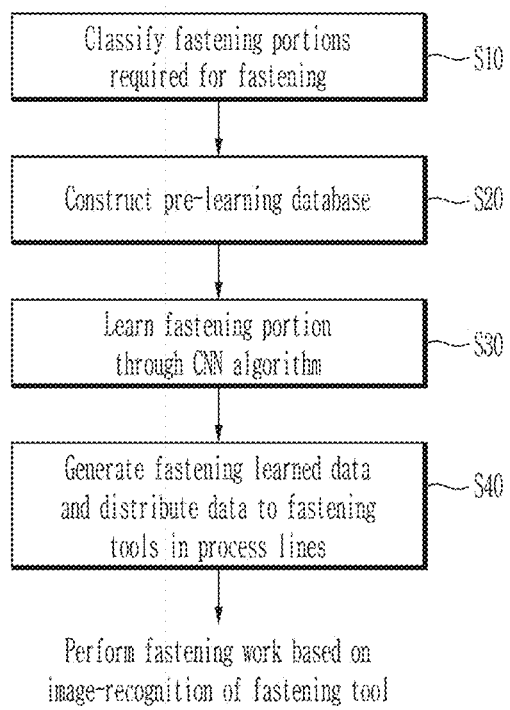
FIG. 3 is a flowchart of a method for generating the fastening learned data through the convolutional neural network (CNN) algorithm according to an embodiment.

For example, FIG. 3 is a flowchart of a method for generating the fastening learned data through the CNN algorithm according to an embodiment.

Figure 4:
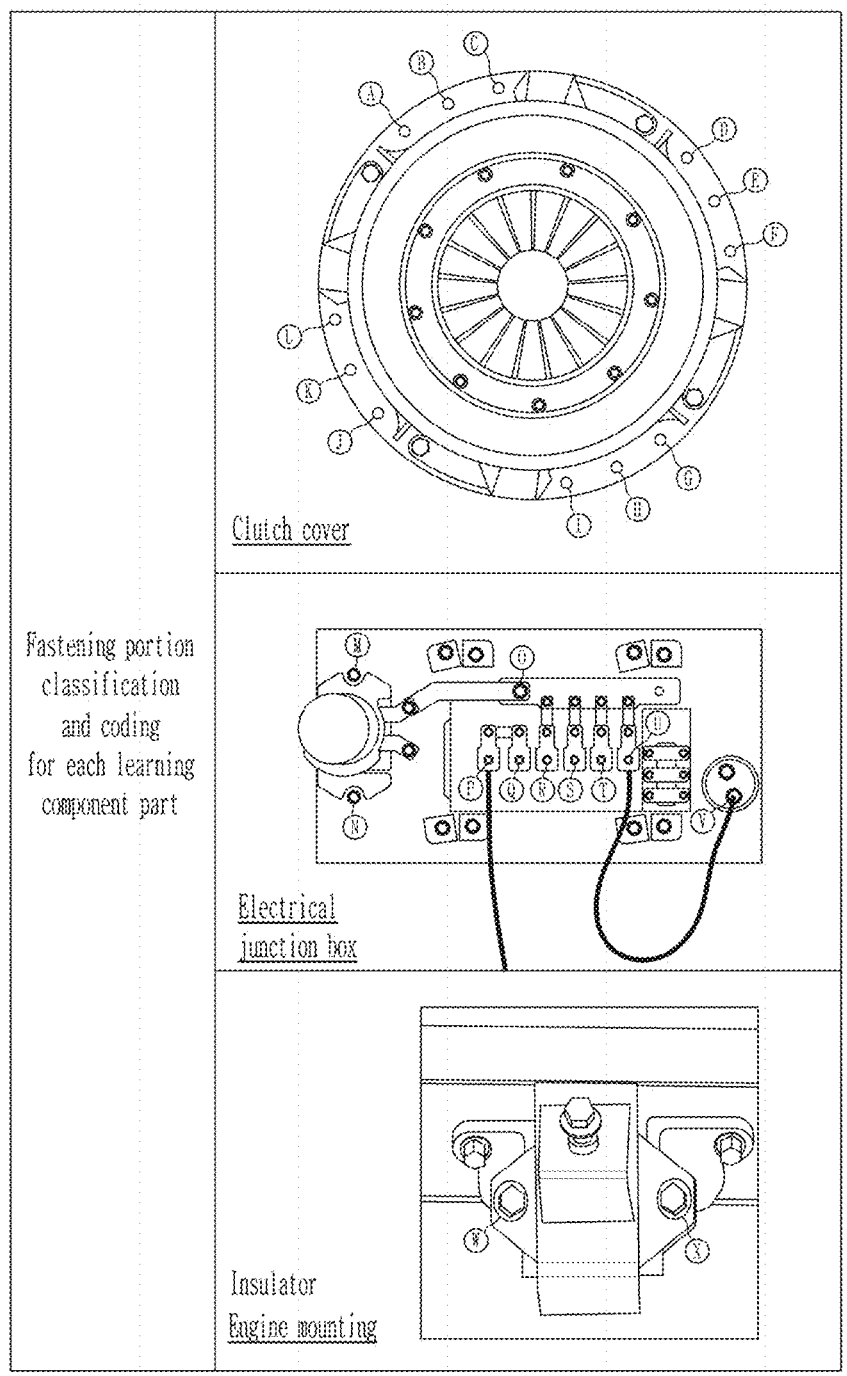
FIG. 4 illustrates examples of fastening portion classification and coding for each learning component part according to an embodiment.

FIG. 4 illustrates examples of fastening portion classification and coding for each learning component part according to an embodiment.

Referring to FIG. 3 and FIG. 4, at step S10, the fastening portion learning portion 310 of the fastening portion learning server 300 classifies fastening portions requiring learning for each component part applied according to a specification of a vehicle.

For example, as shown in the examples of FIG. 4, the fastening portion learning portion 310 classifies each fastening portions A-L, M-V, and W-X required for fastening a clutch cover, an electrical junction box, and an engine mounting insulator, and sets codes to identify each fastening portions.

At step S20, the fastening portion learning portion 310 may construct a database of pre-learning data by photographing real time video images of every fastening portion, for which a worker needs to perform fastening work for each component part.

At this time, the pre-learning data may be generated as images of various rotation angles photographed while rotating the fastening tool 100 around the fastening portion. In addition, the pre-learning data may be generated by photographing as the slope of the fastening tool 100 changes, and by taking images in various situations while the distance from the fastening portion is being changed in a range of 0-10 cm. In other words, the pre-learning data may be constructed in consideration of various positions (or angles) and possibly in all situations, in which a worker may perform the fastening work for the fastening portion in the process line.

At step S30, the fastening portion learning portion 310 may perform the classification work in advance by regarding the learning data images for the same fastening portion as one class and may perform learning of the fastening portion through the CNN algorithm using the pre-learning data. The images used as the learning data of the CNN algorithm may be used for learning of the fastening portion after applying pre-processing, such as rotation matching, brightness adjustment, tool socket image masking, etc., of the images, which is described later.

At step S40, the fastening portion learning portion 310 generate the fastening learned data, by setting torque values corresponding to the learned fastening portions. Then, the fastening portion learning portion 310 distributes the fastening learned data to a corresponding fastening tool in the process lines. The fastening learned data may be generated by classifying vehicle type and various component parts according to vehicle specification information.

Figure 5:
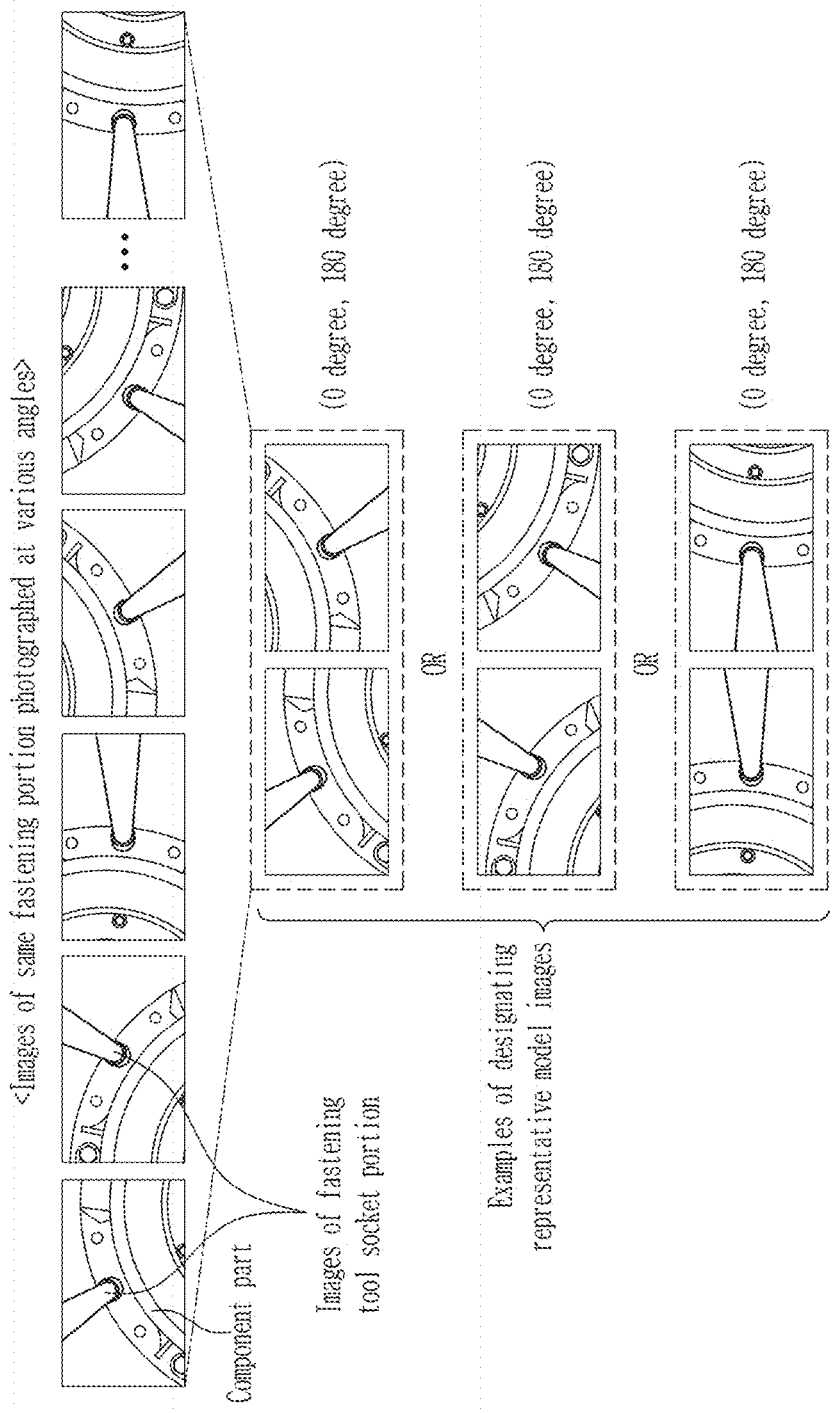
FIG. 5 shows an example of designating a representative model image for lightweight of the CNN algorithm according to an embodiment.

FIG. 5 shows an example of designating a representative model image for lightweight of the CNN algorithm according to an embodiment.

Referring to FIG. 5, according to CNN algorithm according to an embodiment, in order to recognize the fastening portion of the component part, a representative model image of a same fastening portion is designated, and an input image is rotated to determine whether the two images are matched.

the fastening portion learning portion 310 may generate a rotation matching algorithm, in which two representative model images with respect to two rotating directions among the images photographed at various rotation angles are designated at a 180 degree interval (e.g., at 0 degree and 180 degree) with respect to a same fastening portion of the component part. In addition, the fastening portion learning portion 310 may generate a model image learned based on angles of the two representative model images, apply the model image to CNN algorithm-based fastening learned data, and update the model image through additional learning.

Therefore, variety in model images causing an increase of the calculation load to consider various angles may be decreased, and the difficulty of classification of images may also be decreased.

As described above, the fastening portion learning portion 310 provides fastening learned data of lightweight image recognition algorithm to be utilized by the fastening tool 100, and therefore, recognition of the fastening portion image acquired at various angles may be performed at a low calculation load.

The database 320 stores a program and data for operation of the fastening portion learning server 300, and also stores fastening portion code information of fastening learned data obtained by machine learning and torque values matched therewith.

Hereinafter, a control method of the fastening tool according to an embodiment is described in detail with reference to the above-described fastening tool system.

Figure 6:
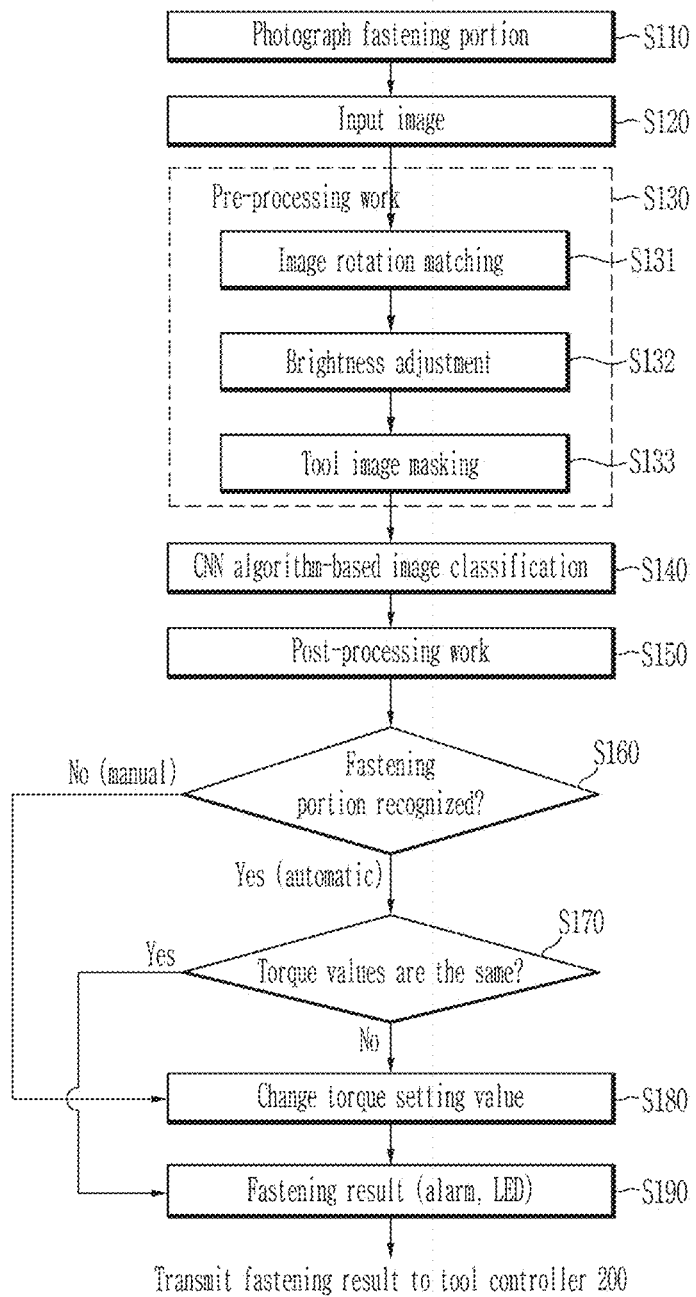
FIG. 6 is a flowchart of a control method of the fastening tool according to an embodiment.

First, FIG. 6 is a flowchart of a control method of the fastening tool according to an embodiment.

Each portion of the fastening tool 100 may be realized by at least one microprocessor executing a program including a set of instructions to perform a function designated in a control method of the fastening tool according to an embodiment.

Referring to FIG. 6, firstly at step S110, the camera portion 110 of the fastening tool 100 according to an embodiment photographs the fastening portion of the component part when the fastening work is initiated as a vehicle enters a process line. At this time, the camera portion 110 may have performed, in advance to the step S110, the process of recognizing vehicle specification information entered into the process line by photographing a barcode or QR code image attached to the vehicle.

At step S120, the image input portion 120 of the fastening tool 100 measures the distance to the fastening portion by the distance measurement sensor 121, and at the time when the distance is within a predetermined distance, transmits the image photographed by the camera portion 110 to the fastening portion determining portion 150 as an input image.

At this time, the fastening portion determining portion 150 uses the input image to estimate recognition of the fastening portion and to determine an appropriate torque value. The estimation process may include an image pre-processing work, a CNN algorithm-based image classification work, and a post-processing work.

First, at step S130, the fastening portion determining portion 150 performs the pre-processing work to utilize the input image in the CNN algorithm-based image classification work.

Here, the pre-processing work is intended to reduce the difficulty of subsequent image classification work and may include image rotation matching at step S131, image brightness adjustment at step S132, and a tool image masking work at step S133.

In general, the worker position in the situation of performing fastening work in the process line is not fixed, and the fastening tool 100 may be held in various directions. In other words, the images for the fastening portion may be generated as images at various rotation angles, and when images at various rotation angles are generated for the same fastening portion, the difficulty of image classification is increased.

Thus, the fastening portion determining portion 150 according to an embodiment reduces the variety in rotation angles and the difficulty of classification for images, through image rotation matching, in which images having various rotation angles are rotated to a specific reference direction and matched with a predetermined representative model image.

Figure 7:
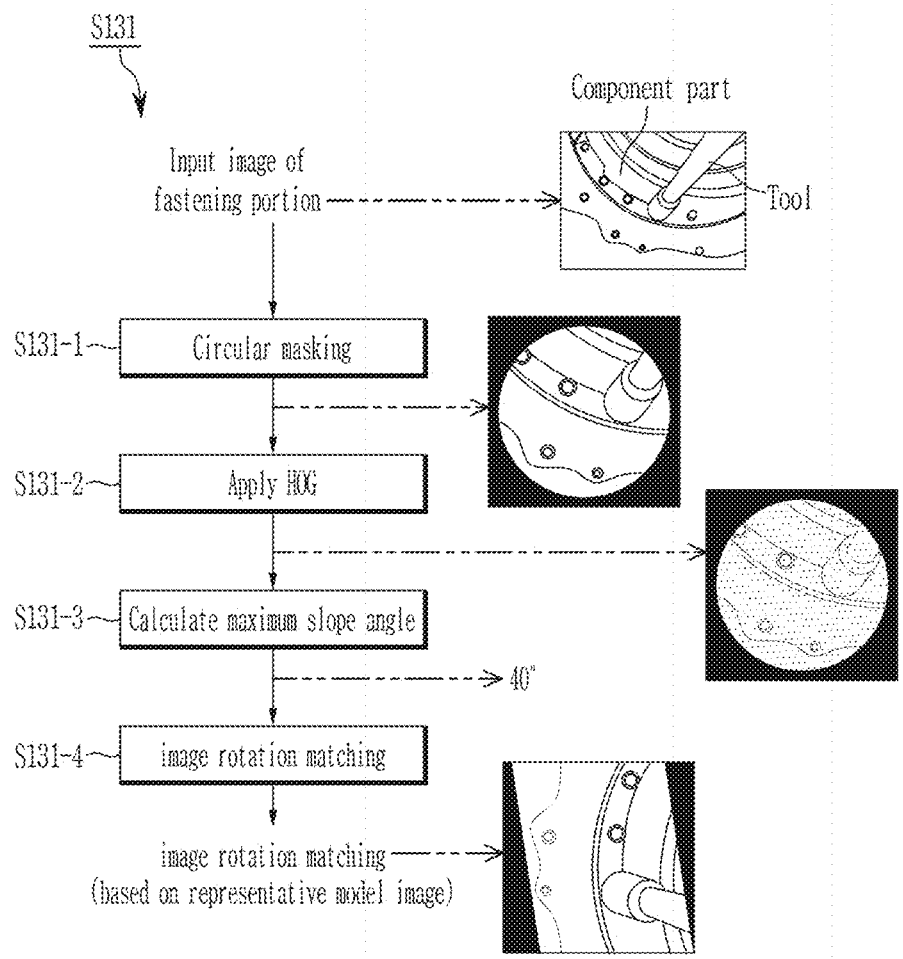
FIG. 7 is a flowchart illustrating an image rotation matching process according to an embodiment.

For example, FIG. 7 is a flowchart illustrating an image rotation matching process according to an embodiment.

Referring to FIG. 7, firstly at step S131-1, the fastening portion determining portion 150 performs masking work on the outer portion of a circle based on the center of the input image of the fastening portion, in order to perform rotation matching on the input image. This is to prevent unnecessary slope components of the outer portion from being calculated during a following histogram of gradient (HOG) work because the main information about the fastening portion is in the central portion of the input image.

Then, at step S131-2, the fastening portion determining portion 150 performs image processing work using a histogram of gradient (HOG) algorithm on the input image, on which the masking work is performed. At this time, the HOG divides the input image into region units (cell units) of a predetermined size and measures a distribution of slope components generated at each region. Here, the HOG has a scheme of matching the histogram of the direction of the edge pixels for each divided region of the image by making a template. Here, the HOG has a scheme of matching a histogram for directions of edge pixels for each divided region of the image. This HOG is characterized by using histogram matching inside each region while maintaining the geometrical information of the region units. Therefore, the outline information has unique information and is suitable for the identification of objects or vehicle component parts that are not complicated in the internal pattern.

At step S131-3, the fastening portion determining portion 150 calculates a statistical value for the entire input image using the slope distribution for each region calculated through HOG, and calculates a maximum slope angle (e.g., 40 degree). At this time, as described with reference to FIG. 5, the slope angle may be calculated based on a predetermined representative model image (0 degree, 180 degree).

At step S131-4, the fastening tool 100 performs the matching by rotating the input image in a direction close to the designated representative model image, assuming that the slope angle is the main angular component for the fastening portion of the input image. For example, if the slope angle of the input image is 40 degree, the representative model image of 0 degree that is close to 40 degree may be matched, and if the slope angle of the input image is 120 degree, the representative model image of 180 degree that is close to 120 degree may be matched.

Thus, the fastening portion determining portion 150 measures the slope angle between 0-180 degrees for the input image through the HOG and performs rotation matching work with the representative model image. Thus, the variety in images photographed at various rotating directions to two rotating directions may be reduced. Therefore, the images photographed at various rotation angles for the same fastening portion are arranged as images in two representative directions. Thus, the difficulty in classification for the input image may be reduced.

Referring back to FIG. 6, in the process of the worker performing fastening work in the process line, the brightness of the input image may also vary due to various illumination environments.

Thus, at step S132, the fastening portion determining portion 150 adjusts the brightness of the image through histogram equalization work in order to remove the classification difficulty due to various brightness for the same fastening portion. In the brightness adjustment of the image, histogram calculation on image pixels is performed by using the input image that is circularly masked during the image rotation matching work.

In addition, the brightness adjustment of the image is performed on the input image after the image rotation matching is performed. This is to prevent the histogram of a black area caused by image rotation matching from being included in the measurement, because main information of the fastening portion is in the central portion of the input image.

As such, the fastening portion determining portion 150 may reduce the effect on the illumination environments by adjusting the image brightness to a medium brightness of a dark or light image through a corresponding image brightness adjustment work.

Figure 8:
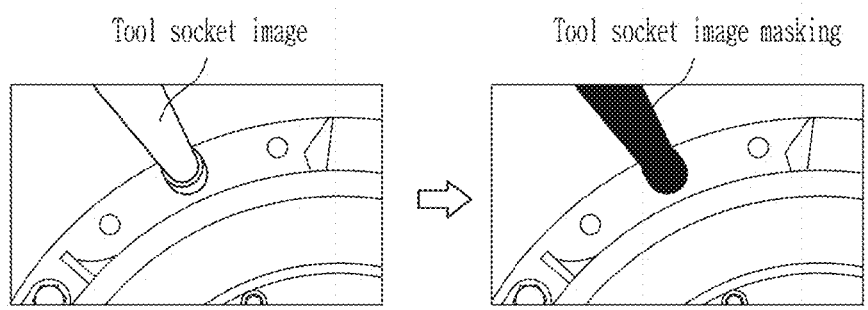
FIG. 8 shows images illustrating a tool image masking work according to an embodiment.

FIG. 8 shows images illustrating a tool image masking work according to an embodiment.

Referring to FIG. 8, when the worker performs a fastening work, the image photographed through the camera portion 110 includes not only the image of the fastening portion, but also an image (hereinafter, called a tool socket image) with a socket mounted on some tools of the fastening tool.

If the tool socket image is always photographed in the same form on the input image, the corresponding portion is fixed and may not significantly affect the performance of the image classification work. However, the socket may be replaced depending on the type/specification of the fastening portion, and the type of tool (e.g., length and thickness) used by each worker may also vary. Since the tools and sockets of the fastening tool 100 may vary, there is a problem that all learning data taking into account of a variety of tool socket images should be collected and learned in performing machine learning algorithm-based image classification work.

To solve this problem, at step S133, the fastening portion determining portion 150 according to an embodiment performs a tool socket image masking work on the fastening tool region in the input image. In other words, since information on the fastening tool region is unnecessary when performing image classification work on the fastening portion, the fastening tool region in the input image is removed using an already created mask map. Therefore, even if the tool and/or socket is changed, the performance of the image classification work may not be affected by removing the effect of the changed tool and/or socket to the fastening portion image. It should be understood that the tool socket image masking work is not limited to the step S133 and may be performed simultaneously with the circular masking work in the step S131.

At step S140, the fastening portion determining portion 150 may estimate a fastening portion through an inference process through a CNN algorithm-based image classification work on a video input image of the same fastening portion finished with the pre-processing work. At this time, the fastening portion determining portion 150 is set with parameter values suitable for model images and CNN algorithm for each fastening portion previously learned in the fastening portion learning server 300. The model image refers to simplified fastening learned data modeled based on the angles of a representative model images designated for each fastening portion.

In the inference process, each frame of the video input image is consecutively input to the CNN algorithm, and CNN algorithm may output a class of the fastening portion, for which each frame of the video input image is classified based on predetermined fastening portion model image, parameter value, and weight value, and also output a probability value representing its reliability.

At step S150, through a post-processing work, the fastening portion determining portion 150 selects the fastening portion of the class having a highest probability value among the class information of the fastening portion and the probability values consecutively output for the video input image during the inference process.

For example, when one class is to be selected from five fastening portions based on the video input image, five probability values are output and the class having the highest probability value is selected. At this time, the class of the fastening portion is determined for each frame of the video image input in a real time, and in the case of a fastening portion that lacks pre-learning data or has high classification difficulty, the class determined for each frame may appear differently because the output for each class is not high. In addition, the estimation results of the class may become different when a video image may be shaken such that some frames among consecutive frames may bounce or become noisy.

To prevent this, the fastening portion determining portion 150 according to an embodiment may accumulate and average the probability information output from a previous frame of the video input image as shown in the following equation 1, to stabilize the classification result for the video input image.

$$P_{t\_mean} = \frac{1}{N}\sum_{k=0}^{N-1} P_{t-k} \qquad \text{(Equation 1)}$$

Here, P is vector information of the probability value output from the CNN algorithm, and N is the number of previous frames preceding the current frame, such that $P_{t\_mean}$ means an average of probability information of previous frames. Through this, the torque value may be prevented from changing for each frame.

At step S160, the fastening portion determining portion 150 determines whether the probability value of the selected fastening portion is above reference ratio (e.g., 50%). When probability value of the selected fastening portion is above reference ratio (S160—Yes), the fastening portion determining portion 150 determines that the recognition of the fastening portion according to the image classification work is successful, and accordingly, automatically sets the torque value according to the recognized fastening portion. It should be understood that the reference ratio may not be limited to 50%, and may be preset to a different value in consideration of specific features of tools, component parts to be fastened, etc.

After automatically setting the torque value according to the recognized fastening portion, the fastening portion determining portion 150 determines, at step S170, whether a current torque setting information equals to the torque value matched with the selected fastening portion.

When the current torque setting information equals to the torque value matched with the selected fastening portion (S170—Yes), the fastening portion determining portion 150 maintains the current torque setting information, and proceeds to step S190 to display a fastening result according to the fastening work at the display 140.

When the current torque setting information does not equal to the matched torque value (S170—No), the fastening portion determining portion 150 changes the torque setting information to the matched torque value at step S180 such that the fastening tool may perform the fastening work by the matched torque value. Then, the fastening portion determining portion 150 proceeds to the step S190 to display a fastening result according to the fastening work at the display 140. At this time, the display 140 displays the fastening portion recognized by current photographing and the appropriate torque value to the worker such that the worker may check whether the fastening tool has correctly determined the fastening portion and has correctly set the torque value.

When probability value of the selected fastening portion is not above reference ratio at the step S160 (S160—No), i.e., when the recognition of the fastening portion according to the image classification work is not successful, the torque value may be manually changed by the worker at the step S180. At this time, the display 140 may indicate the classification fail for the fastening portion and may provide an input menu for manually setting the torque value.

In addition, when the torque value is manually set and the fastening work is performed by the manually set torque value, the fastening portion determining portion 150 stores, as additional learning data, the images photographed for a predetermined period of time immediately prior to the currently performed fastening work, and transmits the additional learning data to the tool controller 200 for updating the learning model of the CNN algorithm.

In the case of CNN algorithm, the probability for the class may also be output for the image that is not learned in advance, e.g., because of not being a target for the fastening work during the inference process, however, in such a case, the probability value becomes very low and may be filtered by the reference ratio, e.g., 50%. In other words, the fastening portion determining portion 150 may regard a target for the fastening work included in the learning data only when the maximum probability value obtained in the inference process is above 50%, and accordingly may output the class information and set the torque value.

In addition, in the case of the target for the fastening work, the probability value for the photographed image may be calculated even if the already learned images are not sufficient for the fastening portion. However, in this embodiment, if the maximum probability value is below 50%, the reliability is significantly decreased, and the torque value is set by manual work.

In addition, the communication portion 130 of the fastening tool 100 transmits fastening work history data including fastening portion recognition information, torque value setting information, and the fastening result according to the fastening work of the component part, to the tool controller 200. Thereafter, the fastening tool 100 repeats the above process by a required the number of the fastening work per vehicle, and then finish the work.

In the above description of the control method of the fastening tool with reference to FIG. 6, each step has been described to be performed by specific elements of the fastening tool 100. However, it should be understood that the elements of the fastening tool 100 may be reorganized to different configuration or integrated to a single element, e.g., the fastening tool 100, and in such a case, each step may be performed by different elements or by the fastening tool 100.

The tool controller 200 collects and stores fastening work history data including fastening portion recognition information, torque value setting information, and the fastening result according to fastening work for the component part of the fastening tool 100.

When the fastening tool 100 is worked, the tool controller 200 receives code values and the number of the fastening work per vehicle with respect to the fastening portion, and compares the received information with reference work information predetermined for the process line, to confirm a normal fastening result or to alarm the worker with missing of fastening work.

In addition, the tool controller 200 may receive the image where the torque value is manually set by the worker due to an image classification work fail (i.e., recognition fail) of the fastening portion as the fastening work history data, and may store the received images as the additional learning data.

In addition, even if the probability value in the inference process of the fastening portion of the fastening tool 100 is above the lower limit reference ratio 50% such that the image classification work is successful, the tool controller 200 may collect, when the probability value is below an upper limit reference ratio (e.g., 90%), the images photographed for a predetermined period of time immediately prior to the currently performed fastening work, and may store the collected images as additional learning data.

The tool controller 200 transmits the additional learning data accumulated for a predetermined period or amount to the fastening portion learning server 300 for learning. Thereafter, the tool controller 200 may receive fastening learned data that is additionally learned with the additional learning data by the fastening portion learning server 300, and in this embodiment, the tool controller 200 may transmit the received fastening learned data to the fastening tool 100 for an update.

The fastening portion learning server 300 collects images obtained when the torque value was manually set due to the recognition fail of the fastening portion or when the probability value in the inference process is below the upper limit reference value, and constructs the additional learning data by a predetermined amount.

At this time, when the accumulate additional learning data reaches 50% of the already learned data (i.e., the pre-learning data), the fastening portion learning server 300 may select 50% of the pre-learning data, and combine the selected 50% with the additional learning data to generate a new learning data set.

The fastening portion learning server 300 updates the model images by performing learning of the CNN algorithm with the new learning data set. At this time, the fastening portion learning server 300 performs the learning process again when the CNN algorithm is updated but uses the already learned model images of the CNN algorithm as an initial value and performs learning with a new learning data set.

Thereafter, the fastening portion learning server 300 newly generates an additional data set in the inference process described above and performs an update process of the model image when the generated amount reaches a target value.

In this way, the fastening portion learning server 300 may perform a repeated and continuous update of the fastening learned data to generate a learned model image adaptively to the propensity of workers and to continuously enhance classification performance and fastening assurance performance for the fastening portion.

As such, according to an embodiment, even if the worker does not know the torque value suitable for the fastening portion, the efficiency of work may be improved and the maintenance cost may be reduced by using same fastening tool with different torques, by automatically performing fastening portion recognition and torque value change through image-based machine learning algorithm provided to the fastening tool.

In addition, by performing learning and updating of fastening learned data by collecting the fastening portion images with low recognition probability as additional learning data during worker fastening work, a learned model image may be generated adaptively to the propensity of workers and classification performance and fastening assurance performance for the fastening portion may be continuously enhanced.

In addition, by performing continuous learning and updating of fastening learned data by collecting the fastening portion images with low recognition probability as additional learning data during worker fastening work, a learned model image may be generated adaptively to the propensity of workers and classification performance and fastening assurance performance for the fastening portion may be continuously enhanced.

Although embodiments have been described above, the present disclosure is not limited thereto, and various other modifications are possible.

For example, in an embodiment described with reference to FIG. 1 and FIG. 2, the fastening tool 100 and the tool controller 200 are described as separate devices but are not limited thereto. The tool controller 200 including an information communication function may be integrated in the fastening tool 100.

At this time, the tool controller 200 may be coupled with the fastening portion learning server 300 through the communication portion 130, and may share hardware, e.g., for input and output functions through the display 140 of a touchscreen.

The embodiments are not limited to be implemented only by the aforementioned apparatus and/or method, and may be implemented by a program for operating a function corresponding to the configuration of the embodiments, a recording medium, in which the program is recorded, and the like, and the implementation may be easily realized from the description of the aforementioned embodiments by those having ordinary skill in the art.

While the present disclosure has been described in connection with what is presently considered to be practical embodiments, it should be understood that the disclosure is not limited to the disclosed embodiments. On the contrary, it is intended to cover various modifications and equivalent arrangements included within the spirit and scope of the appended claims.

DESCRIPTION OF SYMBOLS

100: the fastening tool
110: camera portion
120: image input portion
121: distance measurement sensor
130: communication portion
140: display
150: fastening portion determining portion
200: tool controller
300: fastening portion learning server
310: fastening portion learning portion
320: database

What is claimed is:

1. A fastening tool system for fastening a component part by using a supplied power, the fastening tool system comprising:
a camera portion mounted on a fastening tool to photograph a fastening portion of the component part;
an image input portion for inputting an image photographed from the camera portion when a distance with the fastening portion measured through a distance measurement sensor is within a predetermined distance;
a communication portion for transmitting data by wireless communication; and
a fastening portion determining portion that recognizes the fastening portion through machine learning algorithm-based image classification work for an input image of the camera portion and sets a torque value matched with the recognized fastening portion,
wherein, as pre-processing work for utilizing the input image for the image classification work, the fastening portion determining portion performs:
image rotation matching work that matches the input image having various angles with a representative model image;
brightness adjust work that adjusts brightness of the input image through histogram equalization work; and
tool image masking work that masks a tool socket image existing in the input image.

2. The fastening tool system of claim 1, wherein the camera portion is formed as a near infrared (NIR) camera having an infrared light source.

3. The fastening tool system of claim 1, wherein the distance measurement sensor is positioned to irradiate a laser point to a center of an image photographed by the camera portion.

4. The fastening tool system of claim 1, wherein
the fastening portion determining portion performs the image classification work by utilizing fastening learned data in which the representative model image is set according to vehicle specification information, and
the representative model image is for each fastening portion of the component part learned by convolutional neural network (CNN) algorithm-based learning.

5. The fastening tool system of claim 1, wherein the image rotation matching work comprises:
masking an outer portion of a circle based on a center of the input image;
calculating a slope angle according to a statistical value of slope distribution for each region of the input image obtained through histogram of gradient (HOG) algorithm; and
performing matching by rotating the input image based on the slope angle.

6. The fastening tool system of claim 5, wherein the fastening portion determining portion performs the matching by rotating the input image in a direction close to a representative model image based on the slope angle.

7. The fastening tool system of claim 1, wherein the fastening portion determining portion estimates a fastening portion through an inference process through a CNN algorithm-based image classification work on a video input image of a same fastening portion finished with the pre-processing work.

8. The fastening tool system of claim 7, wherein the fastening portion determining portion selects a fastening portion of a class having a highest probability value among class information of the fastening portion and probability values consecutively output for the video input image during the inference process, and automatically sets the torque value according to the recognized fastening portion when a probability value of a selected fastening portion is above reference ratio.

9. The fastening tool system of claim 1, wherein the fastening portion determining portion outputs fastening portion information and the torque value through a display mounted on the fastening tool.

10. The fastening tool system of claim 1, wherein the fastening portion determining portion comprises a tag recognition program that recognizes vehicle specification information from a barcode or QR code image of a vehicle acquired through the camera portion.

11. A fastening tool system for fastening a component part by using a supplied power, the fastening tool system comprising:
   a camera portion mounted on a fastening tool to photograph a fastening portion of the component part;
   an image input portion for inputting an image photographed from the camera portion when a distance with the fastening portion measured through a distance measurement sensor is within a predetermined distance;
   a communication portion for transmitting data by wireless communication;
   a fastening portion determining portion that recognizes the fastening portion through machine learning algorithm-based image classification work for an input image of the camera portion and sets a torque value matched with the recognized fastening portion;
   a fastening portion learning portion configured to construct learning data on various component parts in advance, and to generate fastening learned data by learning through CNN algorithm; and
   a tool controller configured to code the fastening portion of the component part in conjunction with a fastening portion learning server, and to transmit the fastening learned data for each fastening portion, in which a suitable torque value is matched for each code of the fastening portion, to the fastening tool.

12. The fastening tool system of claim 11, wherein the fastening portion learning server comprises:
   the fastening portion learning portion configured to generate a rotation matching algorithm, in which two representative model images with respect to two rotating directions among images photographed at various rotation angles are designated at a 180 degree interval with respect to a same fastening portion; and
   a database storing fastening portion code information of the fastening learned data and torque values matched with the fastening portion code.

13. The fastening tool system of claim 12, wherein the fastening portion learning portion generates a model image learned based on angles of the two representative model images, applies the model image to CNN algorithm-based fastening learned data, and updates the model image by additional learning.

14. The fastening tool system of claim 11, wherein the tool controller is configured to:
   receive fastening work history data from the fastening tool;
   collect additional learning data when an image classification work of the fastening portion fails or when a probability value in an inference process of the fastening portion is below an upper limit reference ratio; and
   transmit the collected additional learning data to the fastening portion learning server.

* * * * *